Jan. 23, 1968  D. L. CROOK  3,365,207
COMPENSATING-UNIVERSAL CHUCK
Filed Dec. 21, 1964  2 Sheets-Sheet 1

INVENTOR.
Dwight L. Crook,
BY Parker & Carter
Attorneys.

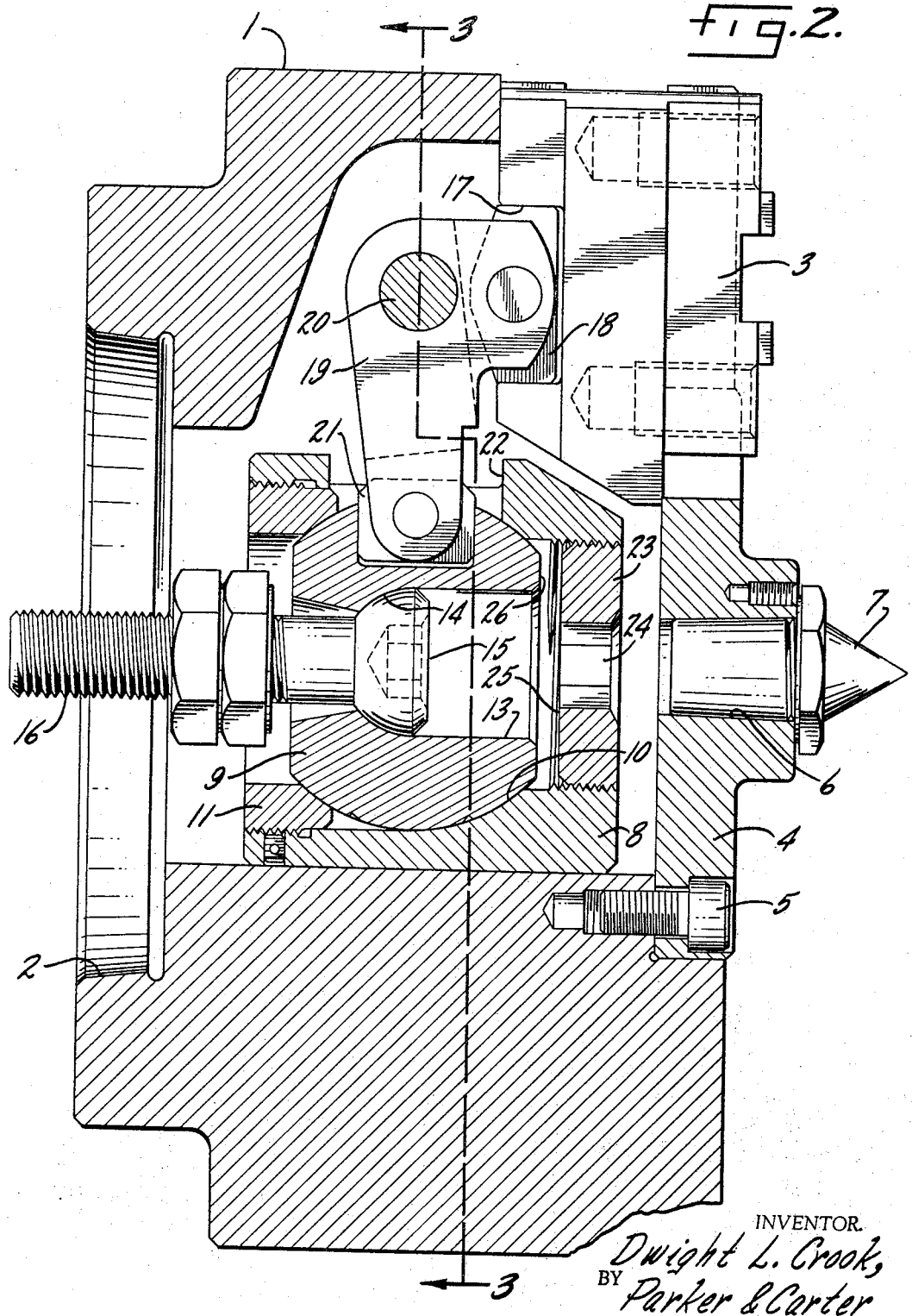

3,365,207
COMPENSATING-UNIVERSAL CHUCK
Dwight L. Crook, Logansport, Ind., assignor to Logansport Machine Co. Inc., Logansport, Ind., a corporation of Indiana
Filed Dec. 21, 1964, Ser. No. 419,645
2 Claims. (Cl. 279—119)

ABSTRACT OF THE DISCLOSURE

A tool holding chuck which includes in one mechanism means for compensating jaw movement to permit holding irregular work pieces for turning on a lathe together with a manual adjusting element which locks the compensating feature out of action and permits normal centering of uniform work pieces. The structure includes a housing, radially movable jaws, an outer draw sleeve mounted for axial movement, an inner draw sleeve socketed therein for locking movement, lever arm connections between the jaws and the inner draw sleeve whereby rocking of the inner sleeve permits continued movement of at least one of the jaws when another jaw has been arrested by contact with the work, together with manually operated locking means to hold the inner draw sleeve against rocking movement.

---

This invention relates to compensating-universal chuck and has for one object to provide a chuck which by a simple adjustment, without removal of the chuck from the machine spindle may be adjusted so that all three chuck jaws advance upon the work piece in unison so that the chuck becomes a universal type chuck or may be adjusted so that the chuck jaws may advance differentially upon the work piece and grip work which is not uniform or central and thus becomes a compensating chuck.

Other objects will apear from time to time throughout the specification and claims.

The invention is illustrated more or less diagrammatically in the accompanying drawings, wherein—

FIGURE 2 is a section along the line 2—2 of FIGURE 1;

Like parts are indicated by like characters throughout the specification and drawings.

Figure 1:
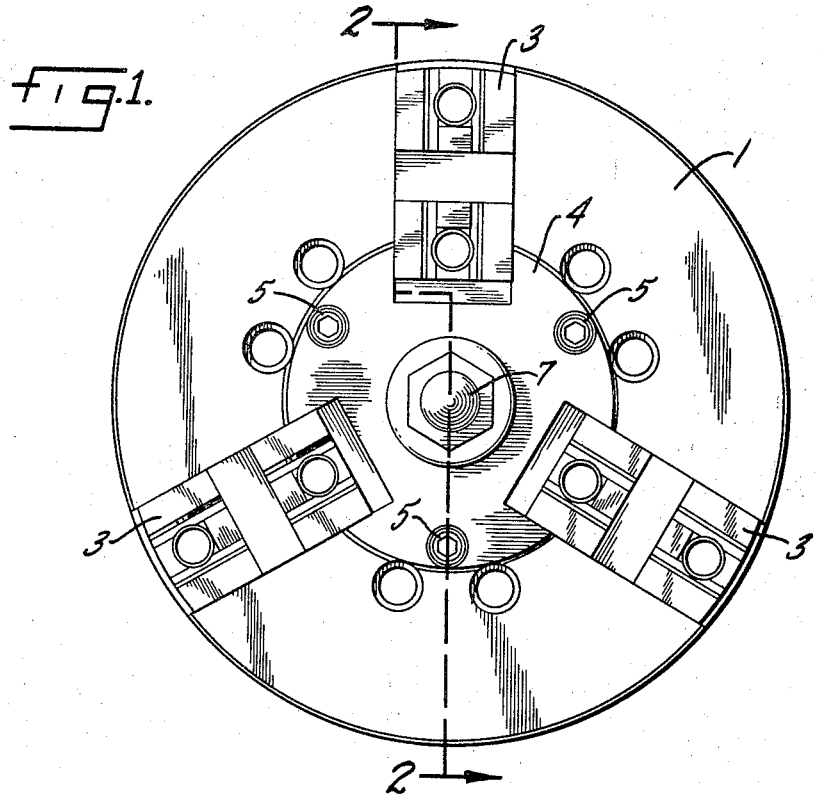
FIGURE 1 is a front elevation of the chuck.
Figure 3:
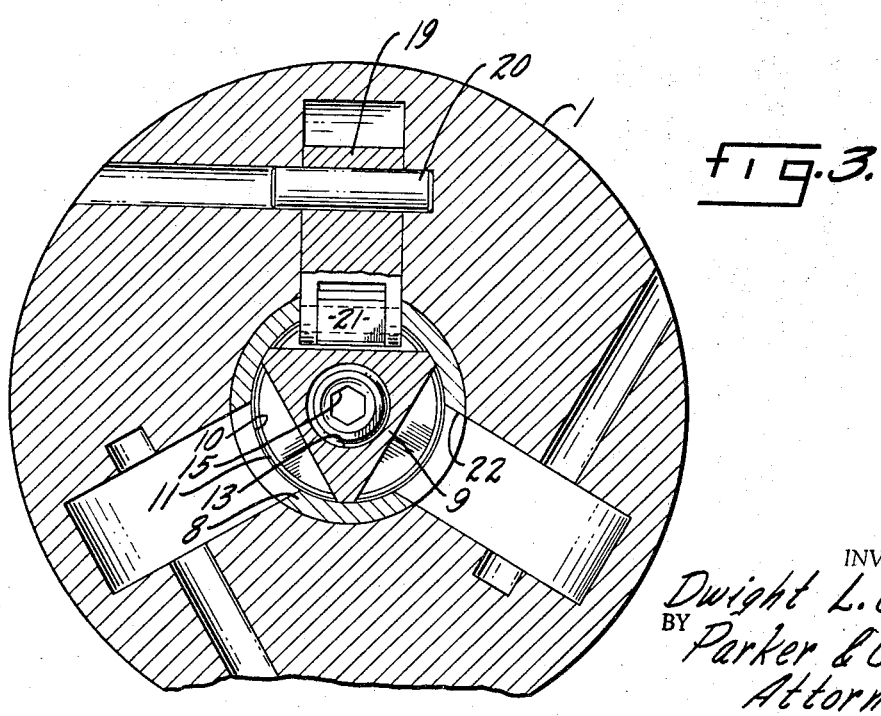
FIGURE 3 is a section along the line 3—3 of FIGURE 2.

The chuck body 1 is adapted to be carried by the machine spindle in any manner as desired, being apertured on its rear end at 2 to receive the machine spindle. The method of attachment is conventional and not illustrated. Mounted for radial movement on the front face of the chuck body are the chuck jaws 3 free to be moved radially toward and from the center of the chuck. The pilot bushing 4 is socketed in the face of the chuck body, being held in place by cap screws 5. The pilot bushing is centrally apertured at 6 and carries the usual removable taper center 7.

Supported for axial movement within the chuck body is the outer draw sleeve 8. The outer draw sleeve encloses in ball and socket relation a spherical inner draw sleeve 9 contacting spherical bearing surface 10 on the inside of the outer draw sleeve, being held firmly thereagainst by the retainer ring 11 so that the inner and the outer draw sleeve are constrained to axial movement together but the inner draw sleeve is free to rock within the outer draw sleeve.

The inner draw sleeve 9 is recessed at 13, the bottom of the recess furthest from the front of the chuck terminating in a spherical bearing surface 14 to receive the spherical head 15 of a draw stud 16, which extends outwardly through the apertured wall of the inner sleeve and through the retainer ring to the machine spindle in the usual manner.

Each chuck jaw is recessed at 17 to receive a jaw swivel block 18 pivoted to the lever 19 which in turn is fulcrummed at 20 in the chuck body. The other end of the lever is pivoted to a draw sleeve swivel block 21 socketed in a slot in the draw sleeve 9, the outer draw sleeve 8 being slotted at 22 to make that possible.

The forward end of the outer draw sleeve 8 is closed by a locking ring 23 which is threaded in the outer draw sleeve and provided with a hexagonal opening 24 adapted to receive a hexagonal wrench not shown. The locking ring 23 is provided with an inner face 25 in opposition to and flat and square with the face 26 of the inner draw sleeve 9.

With the parts in the position shown, the chuck operates as a compensating type. When work is held in position on the center taper plug by mechanical or other means as desired and the draw stud is moved to the left, the chuck jaws move inwardly in the usual manner. One or two of the jaws—assuming that the work is off center or irregular—will contact the work. When that happens that jaw or those jaws stop moving. The other jaw or jaws continue to move independently and the inner draw sleeve rocks in its spherical bearing so that one or both of the remaining chuck jaws engage the work until all three jaws exert their supporting pressure on the work in the usual manner for a compensating type of chuck.

When it is desired to use the chuck as a universal type where the travel of all three jaws is uniform and simultaneous, all that is necessary is to remove the taper center, insert a hexagonal wrench into the opening in the locking ring, screw the locking ring inwardly until the surfaces 25 and 26 come together, thus locking the inner draw sleeve in fixed position in the outer draw sleeve without possibility of angular movement when the chuck operates just as any ordinary universal type chuck is expected to operate. This is done by merely removing the taper center and manipulating the locking ring, the chuck remaining in place on the machine spindle.

I claim:

1. A chuck including a chuck body, chuck jaws mounted for radial movement thereon, a draw sleeve mounted for axial movement in the body and free to rock as it is moved axially, jaw actuating levers pivoted in the body in pivotal relationship with said jaws and with said draw sleeve, and manually operated movable means for holding said sleeve against rocking while permitting axial movement thereof.

2. A chuck body, jaws mounted for radial movement thereon, outer and inner draw sleeves mounted for axial movement in said body, said inner sleeve socketed in the outer sleeve in ball and socket relationship whereby said inner sleeve is adapted to rock with respect to said outer sleeve, a draw stud in ball and socket relationship with said inner sleeve, swivel blocks in said inner sleeve and in said jaws, chuck levers pivoted in the body and in pivotal relationship with said swivel blocks, manually operable means for preventing rocking of the inner sleeve with respect to the outer sleeve.

References Cited

UNITED STATES PATENTS 2,524,485  10/1950  Sloan _____ 279—119
2,617,657  11/1952  Smith _____ 279—119

ROBERT C. RIORDON, *Primary Examiner.*